United States Patent [19]

Kosaraju

[11] Patent Number: 5,884,071
[45] Date of Patent: Mar. 16, 1999

[54] METHOD AND APPARATUS FOR DECODING ENHANCEMENT INSTRUCTIONS USING ALIAS ENCODINGS

[75] Inventor: Chakravarthy Kosaraju, Sunnyvale, Calif.

[73] Assignee: Intel Corporation, Santa Clara, Calif.

[21] Appl. No.: 829,430

[22] Filed: Mar. 31, 1997

[51] Int. Cl.⁶ .................................................... G06F 9/22
[52] U.S. Cl. .......................................... 395/595; 395/385
[58] Field of Search .................................. 395/595, 596, 395/597, 598, 385

[56] References Cited

U.S. PATENT DOCUMENTS

| | | | |
|---|---|---|---|
| 3,889,242 | 6/1975 | Malmer, Jr. | 395/595 |
| 4,130,869 | 12/1978 | Kinoshita et al. | 395/595 |
| 4,159,519 | 6/1979 | Gupta | 395/597 |
| 4,825,363 | 4/1989 | Baumann et al. | 395/595 |
| 5,222,244 | 6/1993 | Carbine et al. | 395/393 |

*Primary Examiner*—Richard L. Ellis
*Attorney, Agent, or Firm*—Blakely, Sokoloff, Taylor & Zafman LLP

[57] ABSTRACT

A decoder circuit decodes a macro-instruction by selecting an alias encoding from the data size encodings in the micro-instruction. The decoder comprises a type detector to determine the macro-instruction type, an extraction circuit for extracting the encoding of the non-multimedia enhancement instructions, a matching circuit for matching the macro-opcode with the opcodes of the multimedia enhancement instructions, and a selecting circuit to select the alias encoding for the micro-instruction. The decoder expands the scope of the data size field to accommodate additional multimedia enhancement instructions without significant change in hardware.

12 Claims, 6 Drawing Sheets

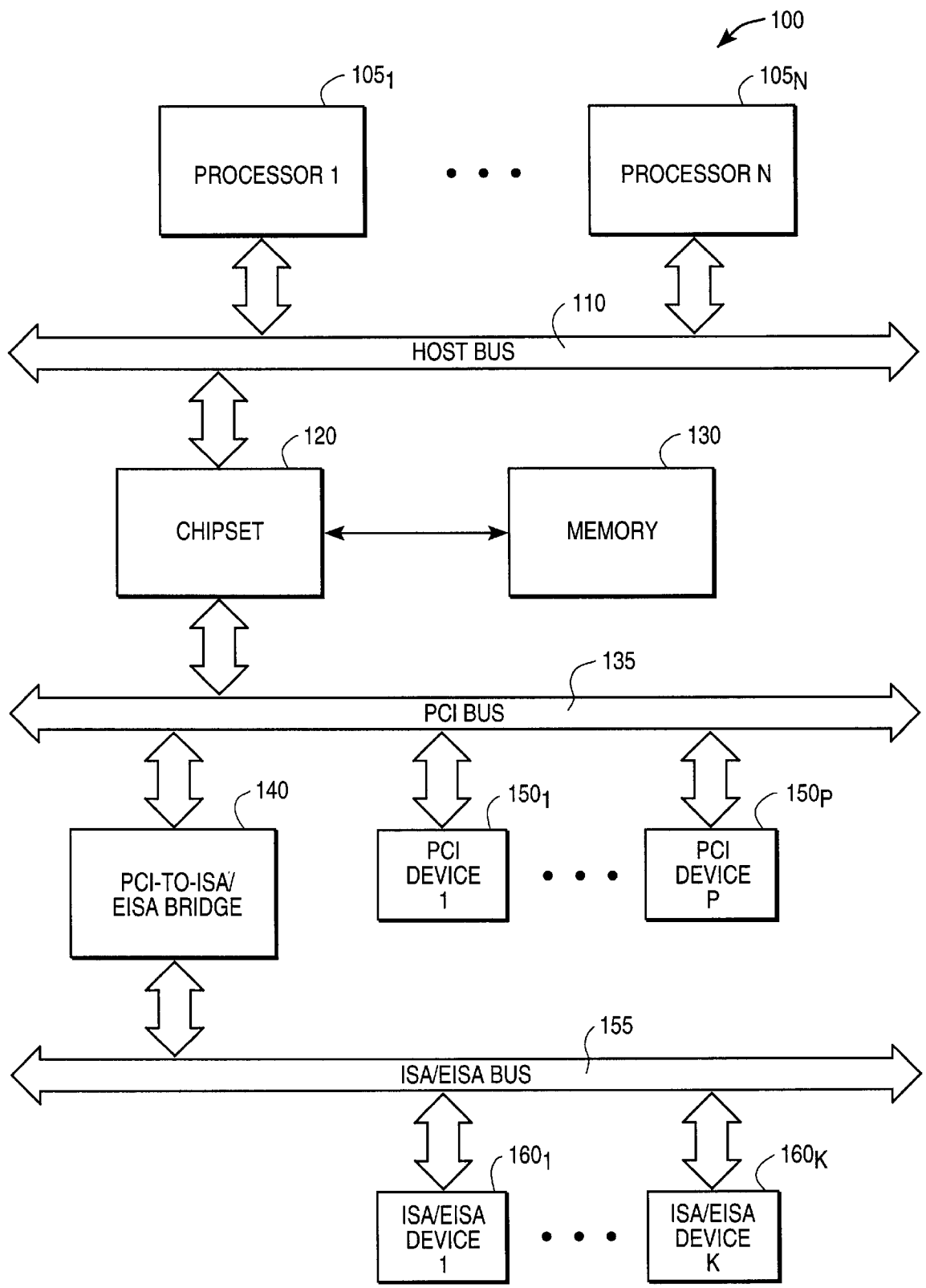
FIG_1

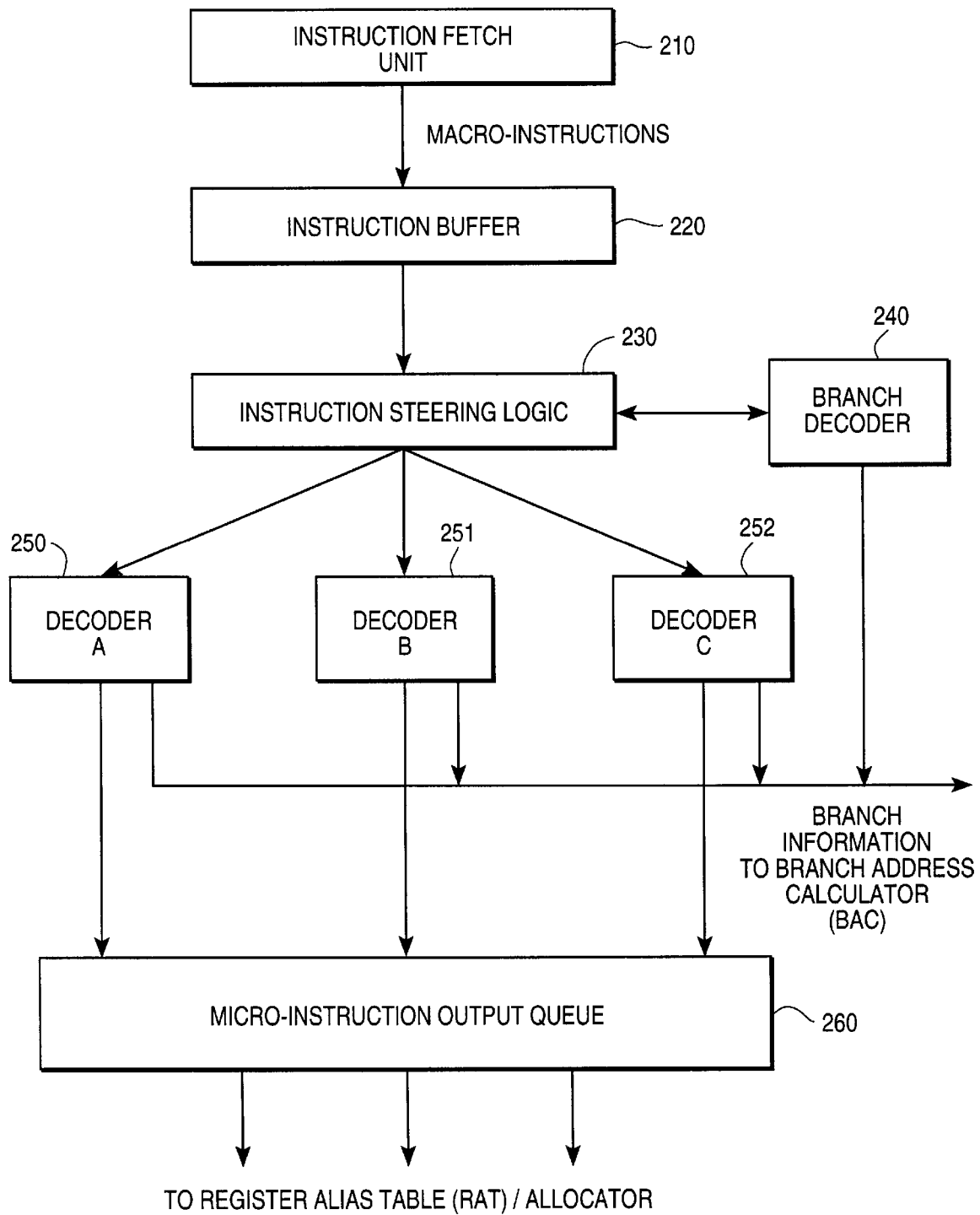
FIG_2

| BIT NO | 11 | 10 | 9 | 8 | 7 | 6 | 5 | 4 | 3 | 2 | 1 | 0 |
|---|---|---|---|---|---|---|---|---|---|---|---|---|
| ENCODING | 0 | 1 | DSZ | | | PORT | | | OPCODE | | | |

FIG_3

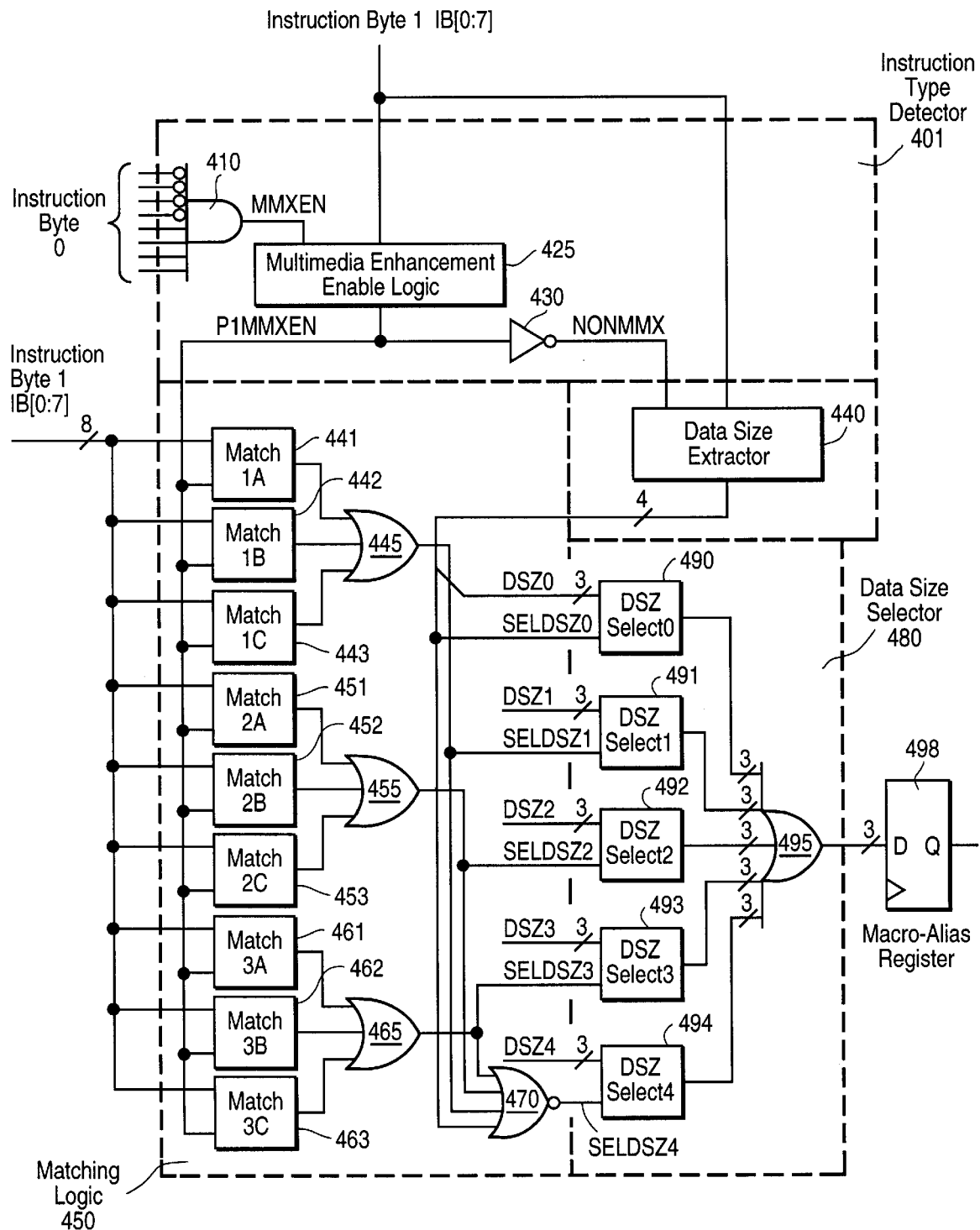
FIG_4

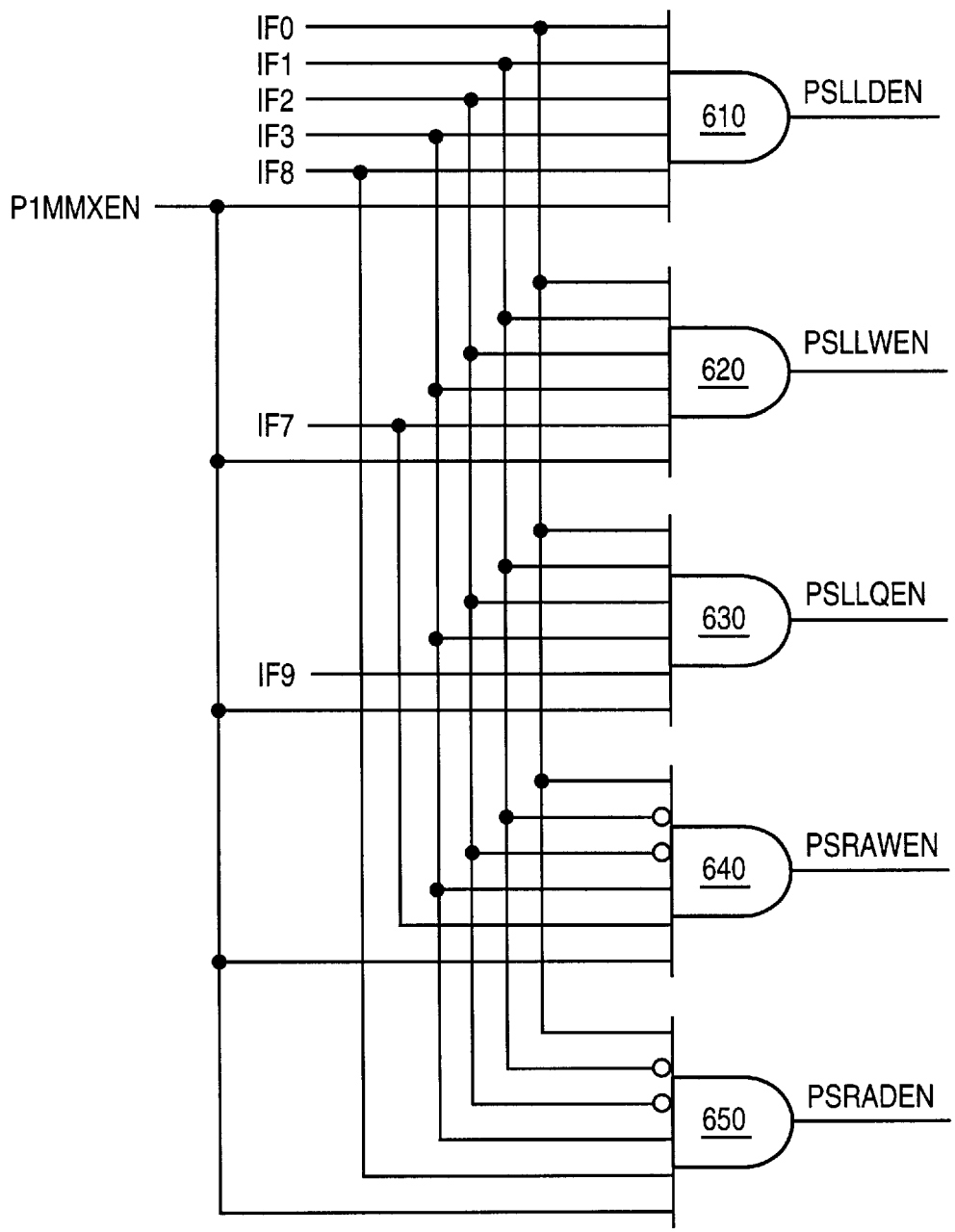
FIG_6 under # 5,884,071

METHOD AND APPARATUS FOR DECODING ENHANCEMENT INSTRUCTIONS USING ALIAS ENCODINGS

BACKGROUND OF THE INVENTION

1. Field of the Invention

This invention relates to the decoding of instructions of two types. In particular, the invention relates to the decoding of the multimedia enhancement technology such as MMX technology instructions and non-multimedia enhancement technology instructions using alias encodings of the data size field.

2. Description of Related Art

In a typical microprocessor architecture, the instruction decoder is responsible for decoding the instructions fetched from the memory. In a microprogrammed architecture, the instruction Operation Code (Opcode) fetched from the memory is referred to as the macro-instruction. This macro-instruction is represented by a macro-opcode which is translated by the instruction decoder into micro-instructions or micro-operations ($\mu$OP). The $\mu$Ops correspond to the primitive or elemental steps in the execution of the macro-instruction.

In the prior art Intel® architecture, the $\mu$Ops are classified into groups according to their formats and types. A portion of the $\mu$Op, called micro-operation code ($\mu$Opcode) is used to determine the type of operation and the group. At the decoding stage, the $\mu$Ops are sent to appropriate ports for execution. In a prior art INTEL® Architecture microprocessor, there are 5 ports connected to appropriate execution units for executing the $\mu$Ops. Each port is allocated specific hardware resources to perform the specified operations. For example, port 0 is for integer and floating-point operations, port 1 is for branch and integer operations, port 2 is for load operations, port 3 is for store address operation, and port 4 is for store data operation.

The multimedia enhancement technology instructions are designed for multimedia applications which include many parallel operations. There are a number of multimedia enhancement technology instructions that need to go to port 1 for execution. However, the field reserved for port 1 instructions is fixed and cannot be expanded for decoding the additional enhancement instructions. This lack of decoding space creates further problems if more enhancement instructions are needed in the future.

In addition, there is a large amount of software that has been developed for the INTEL® Architecture microprocessors including compilers and assemblers that generate the machine codes. To maintain compatibility with these software packages, it is preferred that the machine codes are not recoded to accommodate the additional enhancement instructions.

It is therefore desirable to have a method or apparatus for decoding the enhancement instructions on port 1 while maintaining compatibility with earlier architectures.

SUMMARY OF THE INVENTION

The present invention discloses a decoder for decoding a macro-instruction into a micro-instruction using an alias encoding of a field in the micro-instruction. The decoder comprises a type detector for determining the instruction type, an extraction circuit for extracting a first encoding for the field if the macro-instruction is of a first type, a matching circuit for matching a macro-opcode with a plurality of predetermined bit patterns corresponding to micro-opcodes of a second type, and a selecting circuit for selecting an alias encoding from the first encoding and a plurality of second encodings.

BRIEF DESCRIPTION OF THE DRAWINGS

The features and advantages of the present invention will become apparent from the following detailed description of the present invention in which:

FIG. 1 is a block diagram illustrating a computer system utilizing the present invention.

FIG. 2 is a block diagram illustration of one embodiment of a computer system that operates in accordance with the teachings of the present invention.

FIG. 3 is an illustration of one embodiment of the encoding of Format 1 instructions.

FIG. 4 is an illustration of one embodiment of the decoder in accordance with the teachings of the present invention.

FIG. 6 is an illustration of one embodiment of decoding of micro-instructions to enable the corresponding execution units.

DESCRIPTION OF THE PRESENT INVENTION

Figure 5:
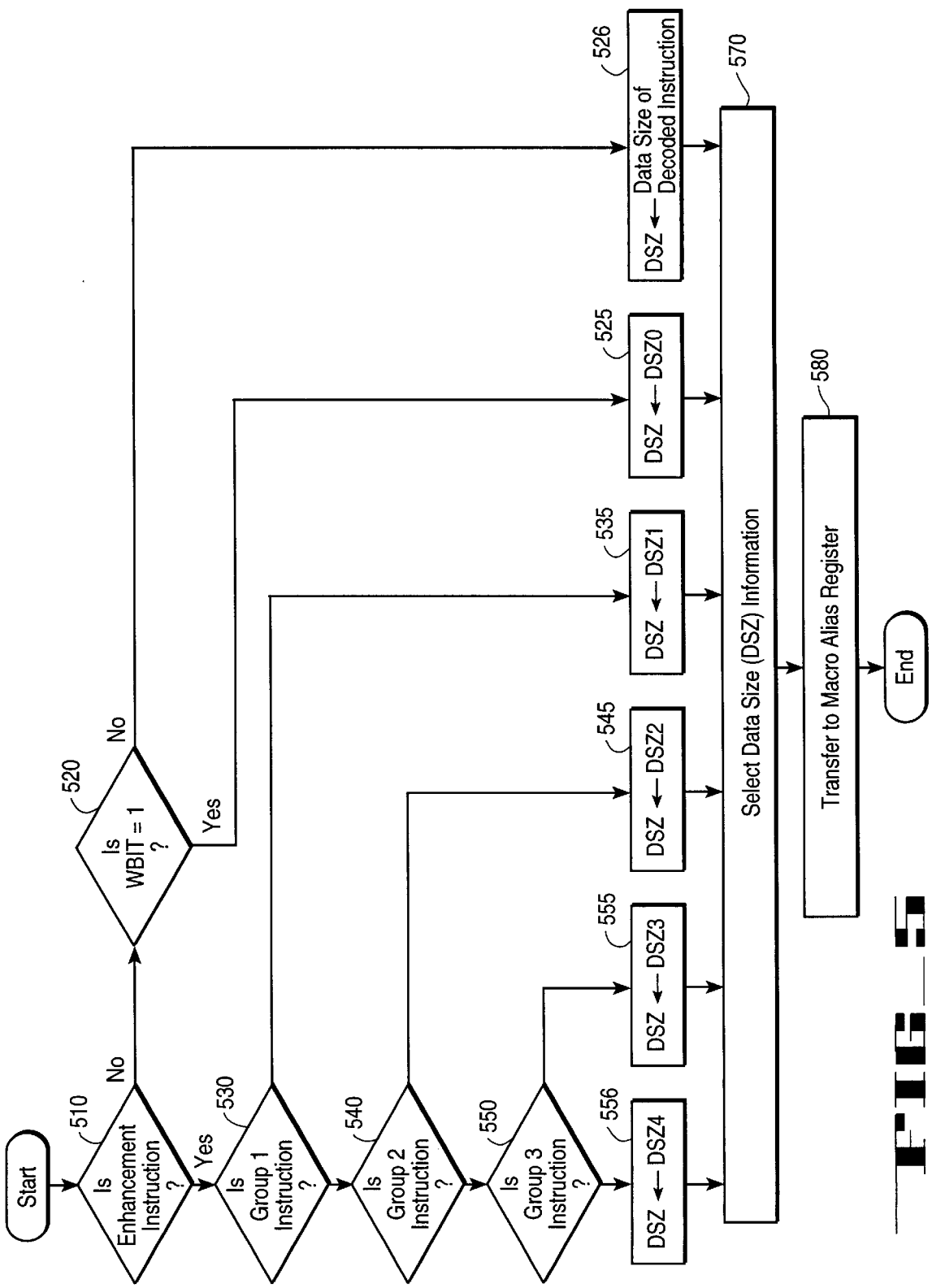
FIG. 5 is a flowchart illustrating one embodiment of the decoder in accordance with the teachings of the present invention.

The present invention discloses a method and apparatus for decoding the multimedia enhancement instructions, such as MMX instructions for execution of Intel® Architecture microprocessors. Two fields in the instruction are used to expand the scope of encodings of the multimedia enhancement instructions: the opcode field and the data size field. The apparatus for decoding includes a type detector, an extraction circuit, a matching circuit and a selecting circuit. The type detector determines whether the instruction is a multimedia enhancement instruction. The extraction circuit provides an encoding for a micro-instruction on the data size field and a corresponding select signal if the instruction is not a multimedia enhancement instruction. The matching circuit provides multimedia enhancement select signals if the instruction is a multimedia enhancement instruction. The selecting circuit selects the alias encoding on the data size field based on the select signals from the extraction circuit and the matching circuit. By using the existing data size field to expand the scope of the multimedia enhancement instruction encodings, the present invention reduces the hardware to decode the multimedia enhancement instructions.

In the following description, for purposes of explanation, numerous details are set forth in order to provide a thorough understanding of the present invention. However, it will be apparent to one skilled in the art that these specific details are not required in order to practice the present invention. For instance, although specific reference is made to MMX instructions, the present invention may be applicable to any instruction in which a field may be expanded using alias encodings. In other instances, well known electrical structures and circuits are shown in block diagram form in order not to obscure the present invention unnecessarily.

Referring to FIG. 1, an illustrative embodiment of a computer system utilizing the present invention is shown. The computer system 100 comprises one or more processors 105$_1$–105$_N$ ("N" being a positive whole number) and a main memory element 130 (e.g., dynamic random access memory "DRAM", static random access memory "SRAM" etc.) coupled together by a chipset 120. In general, the chipset 120 operates as an interface between a host bus 110 and a peripheral bus 135.

Processors $105_1$–$105_N$ are any microprocessors. In one embodiment, processors $105_1$–$105_N$ are the Pentium® processors or Pentium® Pro microprocessors manufactured by Intel Corporation at Santa Clara, Calif.

Chipset 120 typically includes a cache DRAM controller (CDC), a peripheral bus controller, and a data path unit (DPU). The Peripheral Component Interconnect (PCI) Bridge provides a set of host-to-PCI and PCI-to-host bus transaction translations.

The host bus 110 is a bus that can support transactions to a number of coupled processors. Host bus 110 may be referred to as a parallel bus or multiprocessor bus because it supports parallel operations and multiple processors. It is contemplated that host bus 110 operates in a pipelined manner to increase efficiency. However, these features should not be construed to limit the teachings of the present invention. The present invention can be utilized if there is only one processor coupled to the host bus 110.

The peripheral bus 135 provides a communication path between the processors $105_1$–$105_N$ or main memory element 130 and a plurality of peripheral devices $150_1$–$150_P$ ("P" being a positive whole number). These peripheral devices $150_1$–$150_P$ may include I/O devices such as disk controller, data entry interface circuits, and pointing device (e.g., mouse) controllers. The peripheral bus 135 may comprise a Peripheral Component Interconnect (PCI) bus or any other type of bus architecture.

The expansion bus 155 provides a communication path between the peripheral bus 135 and a plurality of expansion peripheral devices $160_1$–$160_K$ ("K" being a positive whole number). The expansion bus 155 may comprise an Industry Standard Architecture (ISA) bus or an Extended Industry Standard Architecture (EISA) bus.

Memory element 130 contains programs to be executed by processors $105_1$–$105_N$. These programs include macro-instructions or other machine codes, comprising one or more bytes, which are decoded by the decoders in processors $105_1$–$105_N$.

Referring to FIG. 2, a block diagram illustrating one embodiment of the present invention is shown. This block diagram shows a typical configuration of the processor shown in FIG. 1. For clarity, only portions relevant to the present invention are shown. Instruction Fetch Unit (IFU) 210 fetches the macro-instructions from the main memory. Each macro-instruction is represented by the macro-instruction operation code (macro-opcode). The macro-opcodes are forwarded to Instruction Buffer 220. Instruction Buffer 220 provides a buffer queue to store the macro-opcodes. In one embodiment, the buffer size is sufficient to receive up to 16 bytes of macro-opcodes. Instruction Steering Logic (ISL) 230 performs preliminary check on the macro-opcodes and steers the macro-opcodes to the appropriate decoder. ISL 230 also detects if the macro-opcode is a branch instruction and interacts with Branch Decoder 240 to generate the corresponding control signals to the Branch Address Calculator (BAC).

The macro-opcodes are decoded by a number of decoders. The number of decoders depends on the macro-instruction format. In one embodiment shown in FIG. 2, there are three decoders: decoder A 250, decoder B 251, and decoder C 252. The main function of these decoders is to translate the macro-opcodes into micro-opcodes. The micro-opcodes represent the micro-instructions that perform the elemental steps in the macro-instructions. There may be multiple micro-instructions for each clock cycle. In one embodiment, the decoders 250–252 generate up to 6 micro-opcodes per clock cycle.

The micro-opcodes are forwarded to Micro-instruction Output Queue (MOQ) 260. MOQ 260 is essentially a First-In-First-Out (FIFO) memory that maintains a finite queue size for storing the micro-opcodes. MOQ 260 sends the micro-opcodes to the Register Alias Table (RAT) and the Allocator. The RAT keeps track of register usage and performs tasks such as register renaming and maintenance of available registers. The Allocator performs resources allocation for the micro-instructions.

The multimedia enhancement instructions operate in parallel on multiple data elements packed into 64-bit quantities. The multimedia enhancement technology uses the Single Instruction, Multiple Data (SIMD) technique. The multimedia enhancement technology supports parallel operations on byte, word, and double word data elements, and the new quad word (64-bit) integer data type. There are some fifty-seven new multimedia enhancement instructions. Many of these instructions are executed by the execution unit at both port 0 and port 1. Some examples of these instructions are: PUNPCKL, PUNPCKH, PACKSS, PACKUS, PSRA, PSRL, PSLL.

The instructions are grouped according to different formats which reflect the general usage of the ports connected to the execution units. Each format has a specific arrangement of fields. For example, format 0 has a format type field, an opcode field, a port field, and a condition field. Format 1 has a format type field, an aliased data size field, a port field, and an opcode field.

Referring to FIG. 3, a representative encoding of format 1 instructions is shown. For illustrative purposes, only twelve (12) bits are shown. Bits 0–3 (IF [0:3]) are used to encode the specific operations. Bits 4–6 (IF[4:6]) comprise an encoding of port corresponding to the instructions. Bits 7–9 (IF[7:9]) comprise an encoding of the data size and are aliased to partially encode the multimedia enhancement instructions to be described later. Bits 10–11 (IF[10:11]) are encoded 0 1 to indicate that these are format 1 instructions.

In one embodiment, the multimedia enhancement instructions that utilize port 1 include the following instructions. Each of these instructions may also have the suffixes to specify the data type as follows: B, W, D, and Q for packed byte, packed word, packed double word, and quad word, respectively.

PACKUS: Pack With Unsigned Saturation. One data type: PACKUSWB.

PACKSS: Pack With Signed Saturation. Two data types: PACKSSWB, ACKSSDW.

PUNPCKL: Unpack Low Packed Data. Three data types: PUNPCKLBW, PUNPCKLWD, and PUNPCKLDQ.

PUNPCKH: Unpack High Packed Data. Three data types: PUNPCKHBW, PUNPCKHWD, and PUNPCKHDQ.

PSLL: Packed Shift Left Logical. Three data types: PSLLW, PSLLD, and PSLLQ.

PSRA: Packed Shift Right Arithmetic. Two data types: PSRAW and PSRAD.

PSRL: Packed Shift Right Logical. Three data types: PSRLW, PSRLD, and PSRLQ.

In addition, instructions can be created as the result of some logical combination of the above instructions. For example, the following instructions are defined as follows:

PSHIMMW=PSRLW OR PSRAW OR PSLLW
PSHIMMD=PSRLD OR PSLLD OR PSRAD
PSHIMMQ=PSRLQ OR PSLLQ

The above seven instructions (PACKUS, PACKSS, PUNPCKL, PUNPCKH, PSLL, PSRA, and PSRL) result in a total of twenty different variations because of the data type specifiers and logic combinations. Each variation corresponds to a micro-opcode. Bits 0–3 of the format 1 encoding are not sufficient to encode these seventeen variations (only $2^4=16$ variations). Furthermore, when additional instructions are needed, more encoding space is desirable.

Bits 7–9 of the format 1 encoding are used to expand the scope of the encoding space. Together with bits 0–3, bits 7–9 can help expand the scope of the encoding space up to 128 macro-opcodes. Since bits 7–9 are used for data size encoding of non-multimedia enhancement instructions, the data size multiplexers are modified to accommodate these additional encodings.

Table 1 shows one embodiment of encoding the seventeen micro-opcodes utilizing the Data Size (DSZ) Bits 7–9.

TABLE 1

| | DSZ VALUE IF [9:7] | | | OP CODE |
|---|---|---|---|---|
| | 001 | 010 | 100 | IF [3:0] |
| packus | | PACKUSWB | | 0101 |
| packss | | PACKSSWB | PACKSSDW | 0100 |
| punpckl | PUNPCKLBW | PUNPCKLWD | PUNPCKLDQ | 0001 |
| punpckh | PUNPCKHBW | PUNPCKHWD | PUNPCKHDQ | 0010 |
| psll | PSLLW | PSLLD | PSLLQ | 1111 |
| psra | PSRAW | PSRAD | | 1001 |
| psr | PSRLW | PSRLD | PSRLQ | 1010 |

Referring to FIG. 4, a diagram illustrating one embodiment of the decoder is shown. The decoder includes Instruction Type Detector 401, Data Size Extractor 440, Matching Logic 450, Data Size Selector 480 and Macro Alias Register 498. The inputs to the decoder include the first two bytes of the macro-instruction: Instruction Byte 0 and Instruction Byte 1. Instruction Type Detector 401 includes AND gate 410 and Multimedia Enhancement Enable Logic 425. AND gate 410 determines if the macro-opcode is a multimedia enhancement instruction by performing an AND operation between the bits of Instruction Byte 0 consistent with the constant 0FH (where "H" refers to Hexadecimal notation). The constant 0HF in the Instruction Byte 0 indicates that the instruction is a multimedia enhancement instruction. If it is a multimedia enhancement instruction, AND gate 410 asserts an enable signal (MMXEN). The MMXEN Signal goes to Multimedia Enhancement Enable Logic 425 to produce enable signals for further decoding.

Instruction Byte 1 (IB[0:7]) indicates the type of operation. It is the second byte of the macro-instruction. Multimedia Enhancement Enable Logic 425 receives the MMXEN signal and Instruction Byte 1 to generate signal P1MMXEN. If the instruction is a multimedia enhancement instruction AND it is a format 1 instruction AND it goes to port 1 exclusively, Multimedia Enhancement Enable Logic 425 asserts the P1MMXEN signal. Inverter 430 complements the PLMMXEN signal to produce the NONMMX signal.

Data Size Extractor 440 receives the NONMMX signal and Instruction Byte 1 IB[7:0] to generate the SELDSZ0 signal and bit pattern DSZ0. SELDSZ0 is a signal which if asserted, indicates that DSZ0 is selected as the data size encoding. DSZ0 is a 3-bit pattern that represents the encoding for the DSZ field to be forwarded to the Macro Alias Register 498. Data Size Extractor 440 produces IF[7:9] representing the DSZ field for the non-multimedia enhancement instructions.

The P1MMXEN signal goes to the Matching Logic 450 which matches the macro-opcode contained in Instruction Byte 1 (IB[0:7]) with individual multimedia enhancement instructions. Matching Logic 450 comprises of several matching sub-blocks 441, 442, 443, 451, 452, 453, 461, 462, and 463. Each matching sub-block logic is active TRUE, i.e., if the opcode matches the assigned bit pattern, then the matching sub-block asserts the output at the HIGH logic level. IB[0:7] and the P1MMXEN signal go to Match 1A 441, Match 1B 442, Match 1C 443, Match 2A 451, Match 2B 452, Match 2C 453, Match 3A 461, Match 3B 462, and Match 3C 463. These matching sub-blocks perform decoding of micro-opcode IF[0:3] as shown in FIG. 3; therefore, at most only one output of these decode logic blocks is asserted.

Each of the matching sub-blocks matches a group of opcodes. The grouping of these opcodes is based on their assignment to the DSZ encoding as shown in Table 1. These logic blocks essentially match the IB [0:7] with the binary patterns representing the macro-opcodes of the macro-instructions. Match 1A 441 matches the macro-opcode of PSHIMMW. Match 1B 442 matches the macro-opcodes of PSLLW, PSRAW, and PSRLW. Match 1C 443 matches the macro-opcodes of PUNPCKLBW and PUNPCKHBW. Match 2A 451 matches the macro-opcodes of PSHIMMD, PSLLD, PSRAD, and PSRLD. Match 2B 452 matches the macro-opcodes of PACKUSWB and PACKSSWB. Match 2C 453 matches the macro-opcodes of PUNPCKLWD and PUNPCKHWD. Match 3A matches the macro-opcodes of PSLLQ and PSRLQ. Match 3B matches the macro-opcodes of PUNPCKLDQ and PUNPCKHDQ. Match 3C matches the macro-opcodes of PSHIMMQ and PACKSSDW.

OR gate 445 combines the outputs of Match 1A 441, Match 1B 442 and Match 1C 443 to generate the SELDSZ signal. The SELDSZ1 signal gates the corresponding alias DSZ encoding to Macro Alias Register 498. The corresponding alias DSZ encoding for SELDSZ1 is a 3-bit pattern DSZ1. From Table 1, the specific bit pattern for DSZ1 is 001. Similarly, OR gate 455 combines the outputs of Match 2A 451, Match 2B 452 and Match 2C 453 to generate the SELDSZ2 signal. The corresponding alias DSZ encoding for SELDSZ2 is a 3-bit pattern DSZ2. From Table 1, the specific bit pattern for DSZ2 is 010. Lastly, OR gate 465 combines the outputs of Match 3A 461, Match 3B 462 and Match 3C 463 to generate the SELDSZ3 signal. The corresponding alias DSZ encoding for SELDSZ3 478 is a 3-bit pattern DSZ3. From Table 1, the specific bit pattern for DSZ3 is 100.

NOR gate 470 acts to assert the SELDSZ4 signals when none of the SELDSZ0, SELDSZ1, SELDSZ2, and SELDSZ3 signals is asserted. The SELDSZ4 signal, therefore, is the default signal to select the default pattern DSZ4. In one embodiment, this default pattern DSZ4 is 010.

At most only one of the SELDSZ0, SELDSZ1, SELDSZ2, SELDSZ3 and SELDSZ4 signals is asserted. When one of the SELDSZ0, SELDSZ1, SELDSZ2, SELDSZ3 signals and SELDSZ4 is asserted, the corresponding pattern DSZ0, DSZ1, DSZ2, DSZ3, or DSZ4 is selected. The selection is performed by Data Size Selector 480. The pattern DSZ0 comes from Data Size Extractor 440. The patterns DSZ1, DSZ2, DSZ3, and DSZ4 are part of Data Size Selector 480. Data Size Selector 480 has Select Logic Blocks DSZ SELECT0 490, DSZ SELECT1 491, DSZ SELECT2 492, DSZ SELECT3 493, and DSZ SELECT4 494. Since only one of the SELDSZ0, SELDSZ1, SELDSZ2, SELDSZ3 and SELDSZ4 signals is asserted, only one of patterns DSZ0, DSZ1, DSZ2, DSZ3 and DSZ4 is selected. The non-selected patterns are inactive. In one embodiment, the inactive patterns are represented by logical LOW ("0"). OR gate 495 masks out the non-selected patterns and passes the selected pattern through to be latched into Macro Alias Register 498. This selected pattern is the alias encoding to be used by the execution unit.

Referring to FIG. 5, a flowchart illustrating the decoding process is shown. At START, it is determined if the macro-instruction is an multimedia enhancement instruction (Step 510). If not, it is determined if the WBIT is equal to zero. The WBIT is an artifact of the earlier Intel® Architecture instruction set to encode the data size. If the WBIT is equal to zero, the Data Size (DSZ) pattern takes the default value DSZ0 (Step 525). If the WBIT is not equal to zero, signifying that the macro-instruction is non-multimedia enhancement instruction and the Data Size is encoded from the macro-instruction, the DSZ pattern takes the value obtained from the decoding of the macro-instruction (Step 526).

If it is determined that the macro-instruction is a multimedia enhancement instruction, it is next determined if the macro-instruction belongs to Group 1 (Step 530). Group 1 includes instructions that use the DSZ1 pattern. If the macro-instruction belongs to group 1, the DSZ pattern takes the value DSZ1 (Step 535). If the macro-instruction to group 2 (Step 540). If yes, the DSZ pattern takes the value DSZ2 (Step 545). If not, it is determined if the macro-instruction belongs to group 3 (Step 550). If yes, the DSZ patterns takes the value DSZ3 (Step 555). Otherwise, the DSZ pattern takes the default value of DSZ4 (Step 556).

From the value assigned to the DSZ pattern, the DSZ information is selected as the assigned value (Step 570). The selected DSZ pattern is then transferred to the Macro Alias Register (Step 580).

Referring to FIG. 6, an example of the matching logic to enable instruction execution for some of the micro-instructions to be used with the execution unit. The matching logic is based on the bit pattern representing the micro-opcode and the DSZ field, i.e., bits 0–3 and bits 7–9 of the micro-instruction shown in FIG. 3. The circuit is shown here for illustrative purposes, it is appreciated that other circuits may be employed to achieve the same result. In FIG. 6, although only micro-instructions PSLLD, PSLLW, PSLLQ, PSRAW, and PSRAD are shown, similar circuits can be obtained for the rest of the micro-instruction set. From Table 1, it is shown that the DSZ is encoded such that only one bit is logical "1". This encoding simplifies the decoding. For example, micro-instructions PSLLD, PSLLW and PSLLQ have the same micro-opcode encoding IF[0:3]=1111, but each has a different DSZ field. To decode these micro-instructions, only the logical "1" bit in the DSZ field is used.

AND gates 610, 620, 630, 640, and 650 assert the PSLLDEN, PSLLWEN, PSLLQEN, PSRAWEN, and PSRADEN signals, respectively, when the micro-opcode of the corresponding micro-instruction is decoded. By way of example, when IF[0:3]=1001 and IF[7]=1, the PSRAWEN signal is asserted indicating that the micro-instruction PSRAW is being decoded.

The PSLLDEN, PSLLWEN, PSLLQEN, PSRAWEN, and PSRADEN signals and the like are used by the execution unit to carry out the execution of the micro-instruction.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A decoder for decoding a macro-instruction into a micro-instruction using an alias encoding of a field in the micro-instruction, said macro-instruction having a macro-opcode and being one of a first type and a second type, comprising:

a type detector determining a type of the macro-instruction;

an extraction circuit coupled to the type detector to extract a first encoding for the field if the macro-instruction is of the first type;

a matching circuit coupled to the type detector to match the macro-opcode with a plurality of predetermined bit patterns corresponding to macro-instructions of the second type; and a selecting circuit coupled to the extraction circuit and the matching circuit to select the alias encoding from the first encoding and a plurality of second encodings.

2. The decoder of claim 1 wherein the first type is non-multimedia enhancement the second type is multimedia enhancement.

3. The decoder of claim 1 wherein the extraction circuit asserts a first select signal if the macro-instruction is of the first type.

4. The decoder of claim 3 wherein the matching circuit asserts one of a plurality of second select signals if the macro-instruction is of the second type.

5. The decoder of claim 4 wherein the selecting circuit selects the alias encoding based on one of the asserted first select signals and the asserted one of the plurality of second select signals.

6. The decoder of claim 5 wherein the matching circuit further comprises a plurality of matching sub-blocks, each of the plurality of matching sub-blocks matching a group of macro-instructions of the second type.

7. The decoder of claim 6 wherein the group of macro-instructions of the second type corresponds to one of the plurality of second encodings.

8. A method for decoding a macro-instruction into a micro-instruction using an alias encoding of a field in the micro-instruction, said macro-instruction having a macro-opcode, comprising the steps of:

detecting a type of the macro-instruction;

extracting a first encoding for the field if the macro-instruction is of a first type;

matching the macro-opcode with a plurality of predetermined bit patterns, said predetermined bit patterns corresponding to macro-instructions of a second type; and selecting the alias encoding from the first encoding and a plurality of second encodings.

9. The method of claim 8 wherein the step of extracting further comprises a step of asserting a first select signal by the extraction circuit if the macro-instruction is of the first type.

10. The method of claim 9 wherein the step of matching further comprises a step of asserting one of a plurality of second select signals by the matching circuit if the macro-instruction is of the second type.

11. The method of claim 10 wherein the step of selecting selects the alias encoding based on one of the asserted first select signal and the asserted one of the plurality of second select signals.

12. The method of claim 8 wherein the step of matching matches the macro-opcode with a group of macro-instructions of the second type, said group of macro-instructions correspond to one of the plurality of second encodings.

* * * * *

UNITED STATES PATENT AND TRADEMARK OFFICE
CERTIFICATE OF CORRECTION

PATENT NO. : 5,884,071
DATED : March 16, 1999
INVENTOR(S) : Kosaraju

It is certified that error appears in the above-identified patent and that said Letters Patent is hereby corrected as shown below:

Column 4,
Line 47, delete "ACKSSDW" and insert -- PACKSSDW --.

Column 5,
Line 55, delete "PLMMXEN" and insert -- P1MMXEN --.

Signed and Sealed this

Second Day of December, 2003

JAMES E. ROGAN
*Director of the United States Patent and Trademark Office*